United States Patent [19]
Johnson

[11] Patent Number: 5,715,558
[45] Date of Patent: Feb. 10, 1998

[54] DUAL AXIS SUSPENSION FOR CAR WASH WRAP BRUSH

[75] Inventor: Archie L. Johnson, Phoenix, Ariz.

[73] Assignee: Superior Investments, Inc., Phoenix, Ariz.

[21] Appl. No.: 637,202

[22] Filed: Apr. 24, 1996

[51] Int. Cl.⁶ .................. B60S 3/06; B08B 7/00
[52] U.S. Cl. .................. 15/53.3; 15/DIG. 2; 15/53.2
[58] Field of Search .................. 15/53.2, DIG. 2, 15/53.1, 53.3, 52.1, 97.3; 134/6

[56] References Cited

U.S. PATENT DOCUMENTS

| | | | |
|---|---|---|---|
| 3,304,565 | 2/1967 | Fuhring | 15/DIG. 2 |
| 3,471,883 | 10/1969 | Ennis | 15/53.3 |
| 3,708,816 | 1/1973 | Napoli | 15/53.2 |
| 3,772,724 | 11/1973 | Wilson | 15/DIG. 2 |
| 3,777,326 | 12/1973 | Haley et al. | 15/53.3 |
| 3,793,667 | 2/1974 | Capra | 15/53.2 |
| 4,021,877 | 5/1977 | Miner | 15/53.2 |
| 4,194,923 | 3/1980 | Johnson | 15/DIG. 2 |
| 4,198,722 | 4/1980 | Ennis | 15/53.3 |
| 4,225,995 | 10/1980 | Ennis | 15/53.3 |
| 4,270,958 | 6/1981 | Ennis | 134/6 |
| 4,299,003 | 11/1981 | Ennis | 15/53.3 |
| 4,354,291 | 10/1982 | Ennis | 15/53.3 |

FOREIGN PATENT DOCUMENTS

| | | | |
|---|---|---|---|
| 74754 | 4/1987 | Japan | 15/53.3 |
| 500998 | 4/1976 | U.S.S.R. | 15/DIG. 2 |

OTHER PUBLICATIONS

"Wrap Around", A.V.W. Equipment Co., Inc., Maywood, Illinois.

Primary Examiner—Gary K. Graham
Attorney, Agent, or Firm—Cahill, Sutton & Thomas, P.L.C.

[57] ABSTRACT

A wrap brush assembly includes an elongated, horizontal upper support arm which pivots from an overhead support about a vertical axis. A pivot link is pivotally connected to the free end of the upper support arm about a horizontal pivot link axis for movement forward and rearward relative to the path traversed by a vehicle to be cleaned. A brush support bracket is pivotally connected to the lower end of the pivot link about an axis lying perpendicular to the pivot link axis for allowing the brush support bracket to swing side to side relative to the path traversed by a vehicle to be cleaned. A motor, brush shaft, and wrap brush are supported from the brush support bracket. A shock absorber dampens forward/rearward movement about the horizontal pivot link axis, and a stop limits inward pivoting movement of the brush support bracket relative to the pivot link to prevent the wrap brush from climbing onto the rear deck of the vehicle. The overhead support includes a horizontal support beam bridging the path traversed by the vehicle to be cleaned; the vertical axis about which the upper support arm pivots is displaced away from the horizontal support beam, and such vertical axis and the brush extend on opposite sides of the horizontal support beam.

11 Claims, 2 Drawing Sheets

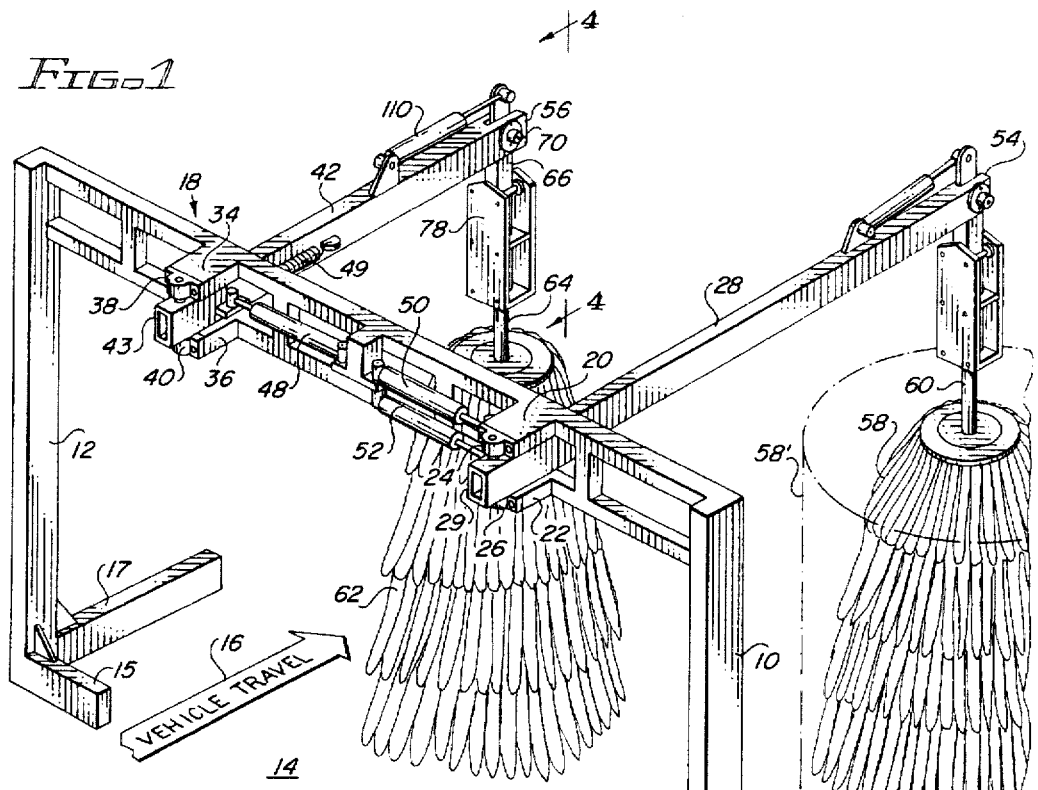
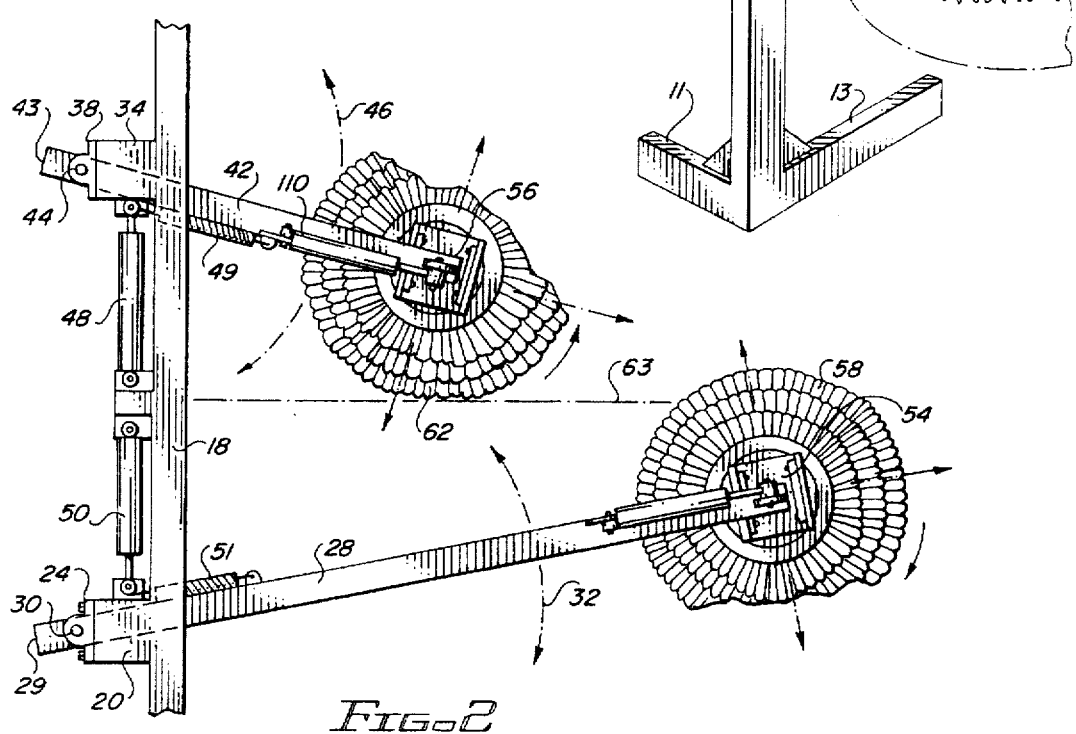

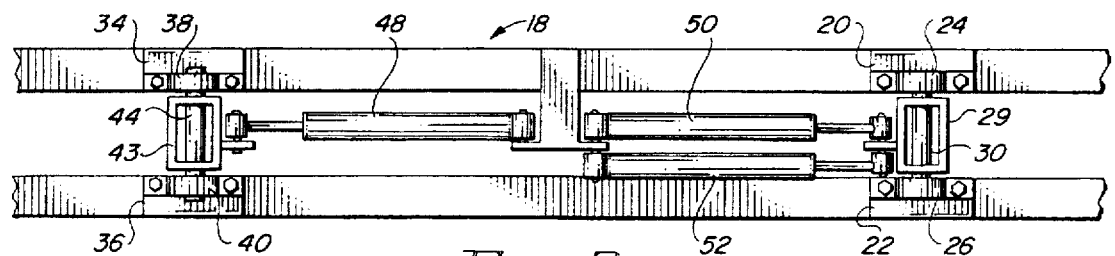
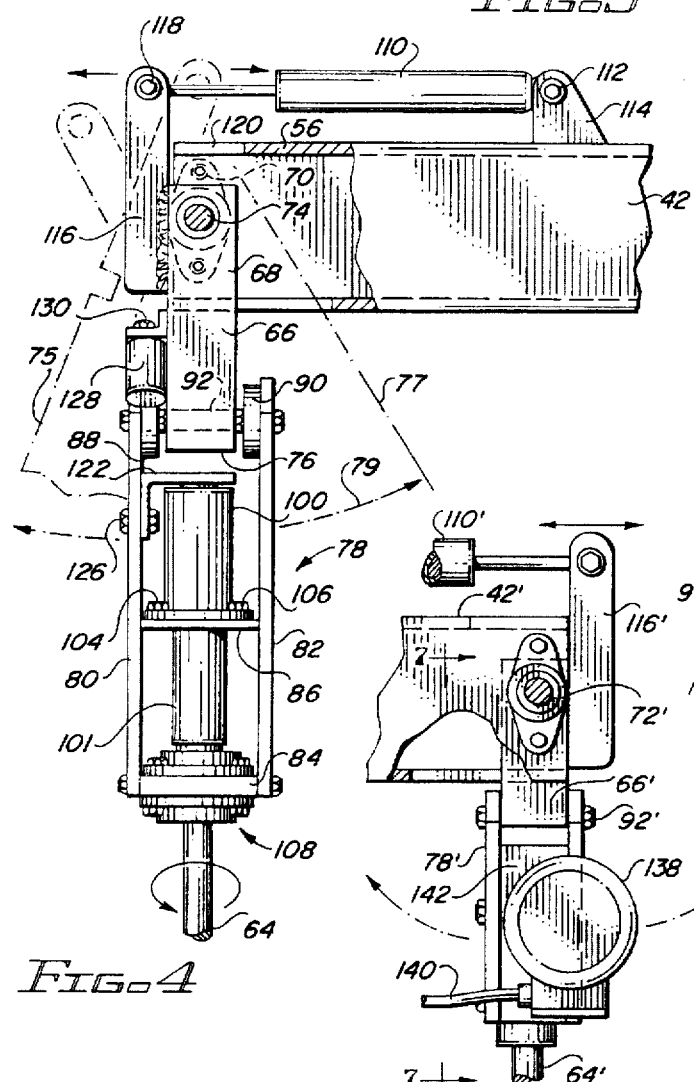
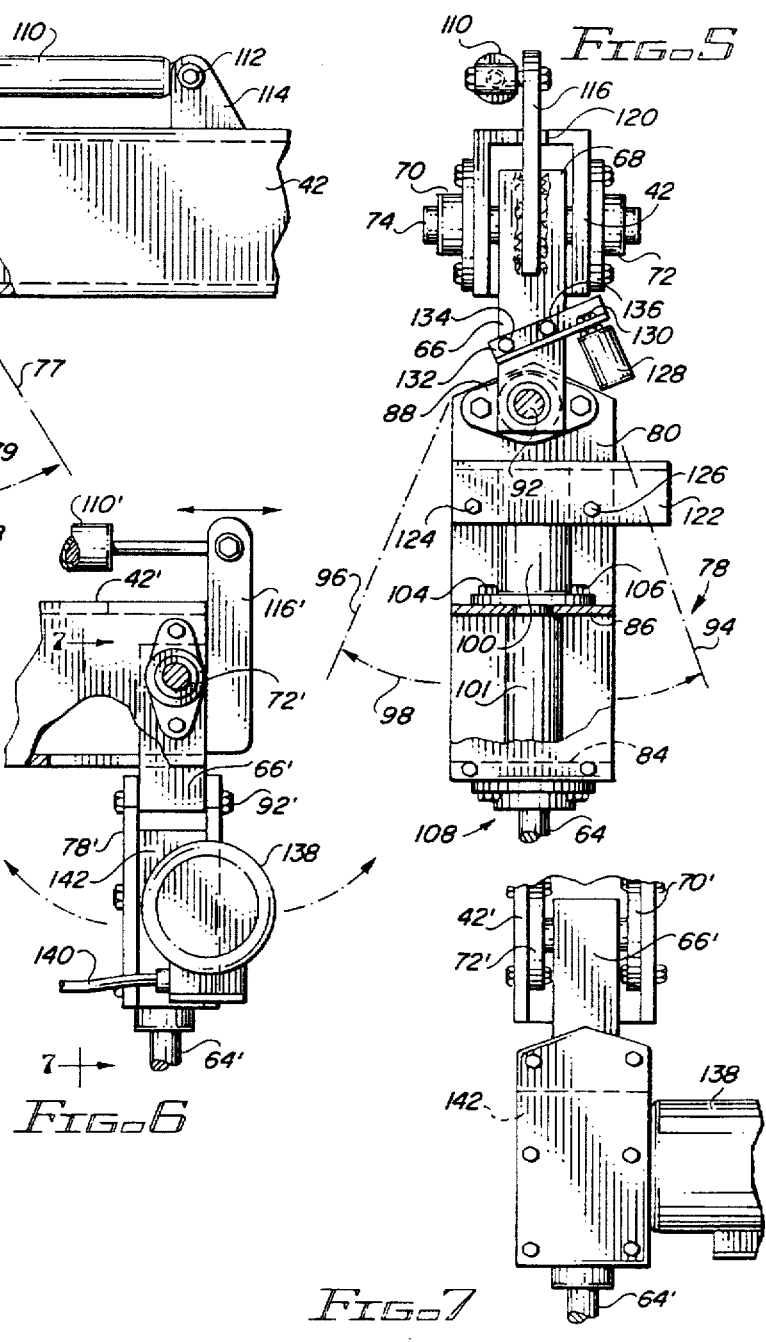

DUAL AXIS SUSPENSION FOR CAR WASH WRAP BRUSH

BACKGROUND OF THE INVENTION

1. Field of the Invention

The present invention relates generally to apparatus used to clean the surfaces of vehicles, and more particularly, to an improved suspension assembly for a rotating wrap brush.

2. Description of the Related Art

Rotating wrap brushes have been used for years within vehicle washing systems. Such rotating wrap brushes consist of a rotating shaft having numerous lengths of fabric secured thereto. As the brush shaft rotates, the lengths of fabric are extended outwardly by centrifugal force to contact the surfaces of the vehicle. Typically, a pair of such rotating wrap brushes are provided to rotate about vertical axes on either side of the vehicle for cleaning the front, side, and rear surfaces of the vehicle. Overhead brushes or mitting curtains may also be provided for cleaning the upper surfaces of the vehicle. Examples of vehicle washing systems incorporating a pair of rotating wrap brushes that rotate about vertical axes are shown in U.S. Pat. Nos. 3,471,883; 4,198,722; 4,225,995; 4,270,958; 4,299,003; and 4,354,291, all issued to Ennis and assigned to N/S Car Wash Enterprises, Inc. of Ingelwood, Calif. Such rotating wrap brushes are often supported from the free end of an overhead arm assembly which pivot through a horizontal arc to allow such wrap brushes to move from side to side, relative to the path of the vehicle through the washing apparatus, in order to move across the front, side, and rear surfaces of the vehicle as the vehicle is moved past such wrap brushes.

Initially, such overhead arm assemblies consisted of a pair of series-connected arms, including a first arm pivoted from a fixed overhead bridge, and a second arm pivoted from the free end of the first arm; the rotating wrap brush was suspended from the free end of the second arm. An example of such a two-arm overhead arm assembly is shown in the aforementioned U.S. Pat. No. 3,471,883. Such two arm support assemblies have generally been replaced by single-arm support arms, the first end of the support arm being pivoted from the overhead bridge and the rotating warp brush being supported from the free end of such overhead arm. An example of such a single-arm overhead support arm assembly is shown in the aforementioned U.S. Pat. No. 4,198,722.

Early rotating wrap brush assemblies maintained each wrap brush shaft along a fixed vertical axis so that the wrap brush was always perpendicular to the ground. The aforementioned U.S. Pat. No. 3,471,883 is an example of such a wrap brush assembly. It was later discovered to be advantageous to allow the brush assembly to swing or tilt away from a perfectly vertical axis upon contacting the surfaces of the vehicle to assist in movement of the brush around the corners of the vehicle. One example of such brush assembly that includes wrap brushes allowed to swing or tilt is shown in the aforementioned U.S. Pat. No. 4,198,722, which discloses the use of either a flexible elastic coupling or a flexible plastic brush shaft to permit the brush to tilt or swing upon impact with the surfaces of the vehicle; in addition, one embodiment shown in FIGS. 15 and 16 of such patent shows a brush assembly pivot mechanism 130 to protect the vehicle and the brush assembly against damage in the event that the vehicle is inadvertently driven into the brush assembly when the wrap brush is not being rotated. The aforementioned U.S. Pat. No. 4,354,291 shows that a flexible spring coupling may also be used to couple the rotating brushes to their associated overhead support arms.

Other support mechanisms for allowing a rotating wrap brush to swing or tilt away from a vertical axis have also been introduced commercially. For example, A.V.W. Equipment Co., Inc. of Maywood, Ill. has offered its "Z-WRAP AROUND" wrap brush assembly with a flexible piece of belting or hose to support the rotating wrap brush from an overhead support arm, thereby allowing the rotating wrap brush to swing or tilt upon contacting the surface of a vehicle.

It has long been known to secure a shock absorber between the overhead support arm and the brush shaft to dampen swinging movement of the wrap brush. For example, the aforementioned U.S. Pat. No. 4,198,722 shows a shock absorber extending between an overhead support arm and a damping plate secured about the brush shaft. It is important to dampen swinging movement of the wrap brush along the direction of the vehicle path. In contrast, swinging or tilting of the wrap brush from side to side should not be dampened (except to prevent the brush from climbing onto the rear deck of the vehicle, as described above) in order to facilitate movement of the brush about the corners of the vehicle. Yet, connection of the shock absorber to the brush shaft inherently dampens side-to-side swinging movements of the wrap brush as well as front-back swinging movements of the wrap brush.

While such flexible couplings of the rotating wrap brush to the overhead support arm provide advantages over wrap brushes that can not swing or tilt, they also introduce a new problem. As the wrap brush contacts the rear surface of the vehicle, the rotating motion of the brush against the vehicle surface causes the brush to ride up along the rear surface of the vehicle toward the center of the vehicle path. In some cases, this climbing action of the brush actually causes the brush to climb up upon the trunk or rear deck of the vehicle, wherein the brush axis is tilted from the vertical by 45 degrees or more. In these instances, the wrap brush can not effectively clean the rear surface of the vehicle.

Another problem which has been noted by the present applicant with known wrap brush assemblies relates to the moment arm and torque exerted by such wrap brush assemblies upon the bridge structure used to support such wrap brush assemblies. The bridge typically includes a pair of standards located on each side of the vehicle path, along with a horizontal cross beam extending between the upper ends of such standards. The weight of the wrap brushes, brush shafts, brush motors, shock absorbers, flexible couplers, etc., is all supported from one end of the upper support arm, which in turn applies a torque or moment arm to the horizontal cross beam of the bridge. Unless the bridge is reinforced, this torque or moment arm is transferred to the standards, which can become bowed from such force. Reinforcement of the bridge through the use of heavier gauge beams, or multiple beams, adds to the expense and physical bulk of the wrap brush apparatus.

Accordingly, it is an object of the present invention to provide a wrap brush assembly which permits the wrap brush to swing or twist to aid in moving around the corners of the vehicle, but which prevents the wrap brush from climbing up the rear surface of the vehicle onto the trunk or rear deck of the vehicle.

It is another object of the present invention to provide such a wrap brush assembly which prevents the wrap brush from swinging excessively inward toward the center of the vehicle path.

It is still another object of the present invention to provide such a wrap brush assembly which dampens front-back swinging movement of the wrap brush without dampening side-to-side swinging movement of the wrap brush.

It is a further object of the present invention to provide such a wrap brush assembly which dampens front-back swinging movement of the wrap brush without connecting a dampening device to the brush shaft.

A still further object of the present invention is to provide such a wrap brush assembly which reduces the torque transferred to the overhead support bridge by the wrap brush support arm.

Yet another object of the present invention is to provide such a wrap brush assembly as a compact unit.

Still another object of the present invention is to provide such a wrap brush assembly which can be made easily and relatively inexpensively.

These and other objects of the present invention will become more apparent to those skilled in the art as the description of the present invention proceeds.

SUMMARY OF THE INVENTION

Briefly described, and in accordance with the preferred embodiment thereof, the present invention relates to a wrap brush assembly for cleaning the outer surfaces of a vehicle and including an overhead support, such as a bridge, as well as an elongated upper support arm that extends generally horizontally between a first end pivotally connected to the overhead support and an opposing second end. The wrap brush assembly further includes a pivot link, which is preferably a rigid member. The upper end of the pivot link is pivotally connected, about a horizontal pivot link axis, to the second end of the elongated support arm. The pivot link axis permits the pivot link to swing in generally a front-back motion relative to the vehicle path.

The wrap brush assembly also includes a brush support bracket, also preferably rigid, that is pivotally connected to the lower end of the pivot link about a bracket pivot axis; however, the bracket pivot axis extends perpendicular to the horizontal pivot link axis, thereby allowing the brush support bracket to pivot from side to side relative to the vehicle path. The wrap brush assembly further includes a cleaning brush having a brush shaft that is supported by the brush support bracket and mounted rotatably thereto. A motor is also supported by, and preferably secured to, the brush support bracket for rotating the brush shaft.

By forming the pivot link and brush support bracket of rigid members, and by disposing the pivot link axis and bracket pivot axis perpendicular to each other, the swinging movement of the wrap brush in the front-back direction can be isolated from the swinging movement of the wrap brush in the side-to-side direction. A shock absorber having a first end secured to the elongated upper support arm and a second end secured to the pivot link is used to dampen pivotal movement of the pivot link about the horizontal pivot link axis, hence, dampening only the swinging movement of the wrap brush in the front-back direction relative to the vehicle path. This shock absorber dampens front-back swinging movement of the wrap brush but does not interfere with side-to-side swinging movement of the wrap brush. Preferably, the second end of such shock absorber is secured to the pivot link proximate the upper end thereof at a point disposed above the horizontal pivot link axis in order to position such shock absorber above the elongated upper support arm. If desired, an additional shock absorber may extend between the overhead support and the elongated upper support arm for dampening pivotal movement of the elongated upper support arm.

The wrap brush assembly preferably includes a stop for limiting inward pivotal movement of the brush support bracket about the bracket pivot axis relative to the pivot link for preventing the cleaning brush from climbing onto the trunk or rear deck of the vehicle to be cleaned. This stop does not interfere with side-to-side movement of the wrap brush until the brush shaft swings away from the vertical axis inwardly toward the center of the vehicle path by an excessive amount; at that point, the stop precludes further pivotal movement of the brush support bracket relative to the pivot link.

The present invention also relates to a wrap brush assembly that includes a pair of vertical standards located on opposing sides of the vehicle path, along with a horizontal support beam secured to and extending between the pair of vertical standards to provide a bridge, and an arm support bracket having first and second opposing ends. The first end of the arm support bracket is secured to the horizontal support beam; the arm support bracket extends horizontally and generally perpendicular to the horizontal support beam in a first direction relative to the vehicle path. The elongated upper support arm mentioned above includes a first end pivotally connected to the second end of the arm support bracket for movement about a vertical axis. This vertical axis is displaced away from the horizontal support beam, and the elongated upper support arm extends generally horizontally from the first end thereof toward the second end thereof in a second direction opposite to the first direction. A cleaning brush, brush shaft, and driving motor are supported from the second end of the arm support bracket.

By providing the aforementioned arm support bracket, the vertical axis about which the upper support pivots is established on the opposite side of the horizontal support beam where the brush, brush shaft, and driving motor are located. This relationship maintains the wrap brush assembly as a more compact unit and reduces the torque applied by the upper support arm to the support bridge.

BRIEF DESCRIPTION OF THE DRAWINGS

FIG. 1 is a perspective view of a wrap brush assembly including a pair of wrap brushes constructed in accordance with the teachings of the present invention.

FIG. 2 is a top view of the apparatus shown in FIG. 1.

FIG. 3 is an end view of the horizontal support beam and upper support arms shown in FIG. 1.

FIG. 4 is a sectional view of the free end of an upper support arm, pivot link, brush support bracket, hydraulic drive motor and brush shaft shown in FIG. 1, taken through the plane designated by lines 4—4 within FIG. 1.

FIG. 5 is a front view of the components shown in FIG. 4.

FIG. 6 is a side view, similar to FIG. 4, but directed to an alternate embodiment of the invention incorporating an electric drive motor.

FIG. 7 is a front view of the components shown in FIG. 6.

DETAILED DESCRIPTION OF THE PREFERRED EMBODIMENTS

FIGS. 1 and 2 illustrate a wrap brush assembly for cleaning the outer surfaces of a vehicle (not shown) and including a pair of vertical standards 10 and 12 located on opposing sides of the path 14 traversed by a vehicle to be cleaned. The lower end of standard 10 includes legs 11 and 13, while the lower end of standard 12 includes legs 15 and 17. Throughout this description, it will be assumed that such standards remain fixed, and that the car or other vehicle travels between and past such standards in the direction indicated by arrow 16 in FIG. 1. However, those skilled in the art will understand that the vehicle to be cleaned may remain in a fixed position, and that vertical standards 10 and 12 could, if desired, be secured to a movable carriage that moves back and forth along the length of the car. In addition, while arrow 16 indicates the preferred direction of vehicle travel, it is also possible to move the car in the opposite direction from that indicated by arrow 16, provided that the direction of rotation of the cleaning brushes is reversed.

Referring to FIGS. 1–3, a horizontal support beam 18 is secured to and extends between the uppermost ends of vertical standards 10 and 12 above the vehicle path 14. Horizontal support beam 18 and vertical standards 10 and 12 together provide a bridge that serves as an overhead support for pivotally supporting at least one, and preferably two, upper support arms. A first pair of arm support brackets 20 and 22 are secured at first ends thereof to horizontal support beam 18 proximate standard 10. Each of such first arm support brackets 20 and 22 extend generally perpendicularly and horizontally from horizontal support beam 18 toward their respective second ends in a first direction opposite to the direction of vehicle travel 16. Secured to the second ends of arm support brackets 20 and 22 are pivot bearings 24 and 26, respectively. A first elongated upper support arm 28 includes a first end 29 pivotally connected to the second ends of the first arm support brackets 20 and 22 by a pivot pin 30 received within pivot bearings 24 and 26 for movement about a vertical axis, thereby allowing elongated upper support arm 28 to swing through a horizontal plane, as indicated by dashed arrows 32 in FIG. 2. Pivot pin 30 may be secured to first end 29 of upper support arm 28 and extend vertically above and below upper support arm 28.

In the preferred embodiment of the present invention, the above-described bridge also supports a second elongated upper support arm. A second pair of arm support brackets 34 and 36 are secured at first ends thereof to horizontal support beam 18 proximate standard 12. Each of such second arm support brackets 34 and 36 extend generally perpendicularly and horizontally from horizontal support beam 18 toward their respective second ends in the direction opposite to the direction of vehicle travel 16. Secured to the second ends of arm support brackets 34 and 36 are pivot bearings 38 and 40, respectively. A second elongated upper support arm 42 includes a first end 43 pivotally connected to the second ends of the second arm support brackets 34 and 36 by a pivot pin 44 received within pivot bearings 38 and 40 for movement about a second vertical axis, thereby allowing elongated upper support arm 42 to swing through a horizontal plane, as indicated by dashed arrows 46 in FIG. 2.

As also shown in FIGS. 1–3, one or more shock absorbers may be used to dampen swinging movement of upper support arms 28 and 42. For example, shock absorber 48 extends between first end 43 of upper support arm 42 and horizontal support beam 18 to dampen swinging movements of upper support arm 42. Likewise, shock absorbers 50 and 52 extend between upper support arm 28 and horizontal support beam 18 to dampen swinging movements of upper support arm 28. Upper support arm 28 requires two such shock absorbers because support arm 28 is longer than support arm 42, and hence, the torque generated by upper support arm 28 is greater than the torque developed by upper support arm 42. The reason that upper support arm 28 is made longer than upper support arm 42 is explained in greater detail below. Within FIG. 2, the centerline of the vehicle path is designated by dashed line 63. As indicated in FIGS. 1 and 2, a pair of return springs 49 and 51 extend from horizontal support beam 18 to upper support arms 42 and 28, respectively, for biasing upper support arms 42 and 28 generally toward centerline 63 of the vehicle path. Rubber bumpers (not shown) secured to horizontal support beam 18 serve to limit inward swinging movement of upper support arms 28 and 42.

Upper support arm 28 extends generally horizontally from first end 29 thereof towards second end 54, and generally in the direction of vehicle travel 16. Likewise, upper support arm 42 extends generally horizontally from first end 43 thereof towards second end 56, again generally in the direction of vehicle travel 16. As shown in FIGS. 1 and 2, a wrap brush 58 is supported from second end 54 of upper support arm 28. Within FIG. 1, wrap brush 58 is shown in solid line representation at rest, i.e., not rotating. During rotation of wrap brush 58 about brush shaft 60, the lengths of fabric that form wrap brush 58 fly outward toward the expanded cylindrical shape shown in dashed outline by reference numeral 58'. Similarly, wrap brush 62 is supported from second end 56 of upper support arm 42. As shown in FIG. 2, wrap brush 58 is rotated in a clockwise direction to walk wrap brush 58 around the front right corner of a vehicle, along the right side of the vehicle, and around the rear right corner of the vehicle. As is also shown in FIG. 2, wrap brush 62 is rotated in a counter-clockwise direction in order to walk wrap brush 62 around the front left corner of the vehicle, along the left side of the vehicle, and around the rear left corner of the vehicle. As indicated within FIG. 2, the outer periphery of wrap brushes 58 and 62, when rotating, each slightly overlaps centerline 63 as such wrap brushes initially contact the front surface of the vehicle, and as such wrap brushes terminate their contact with the rear surface of the vehicle. The above-described springs 49 and 51 and associated rubber bumpers (not shown) cause the outer periphery of wrap brushes 58 and 62 to slightly overlap centerline 63 both at the beginning of each car wash cycle and at the end of each car wash cycle. The specific manner in which such wrap brush assemblies are supported for rotation is described in greater detail below with respect to FIGS. 4–7.

As shown in FIGS. 1, 4 and 5, upper support arm 42 is formed by a length of tubular stock that is rectangular in cross-section. Near second end 56 of upper support arm 42, the bottom wall of such tubular stock is cut away, leaving an inverted U-shape best shown in FIG. 5. A pivot link 66, which may be formed of rigid square tubing stock, has an upper end 68 pivotally connected to second end 56 of upper support arm 42 about a horizontal pivot link axis; bearing assemblies 70 and 72 are secured to opposing sides of second end 56 of upper support arm 42 for supporting a bearing shaft 74 that passes through second end 56 and through upper end 68 of pivot link 66. In this manner, pivot link 66 can swing forward and backward, relative to the direction of vehicle travel 16, but not from side to side. This forward and backward movement is indicated within FIG. 4 by dashed lines 75 and 77, and by dashed arrows 79.

Suspended from the lower end 76 of pivot link 66 is a brush support bracket designated generally by reference numeral 78. Brush support bracket 78 includes a pair of vertical side plates 80 and 82 connected by a perpendicular bottom plate 84. A pair of bearing assemblies 88 and 90 are secured to the inner faces of the upper ends of vertical side plates 80 and 82 for supporting a bearing shaft 92 that passes through the upper ends of vertical side plates 80 and 82 and through the lower end 76 of pivot link 66. Thus, brush support bracket 78 is pivotally connected to the lower end of pivot link 66 about a bracket pivot axis (i.e., bearing shaft 92) that extends perpendicular to the horizontal pivot link axis (i.e., bearing shaft 74). In this manner, brush support bracket 78 can swing from side to side, relative to the direction of vehicle travel 16, but not forward or backward. This side to side movement is indicated within FIG. 5 by dashed lines 94 and 96, and by dashed arrows 98.

Brush support bracket 78 is used to rotatably support wrap brush 62 and its associated brush shaft 64. A hydraulic motor 100 used to rotate brush shaft 64 is disposed between vertical side plates 80 and 82 of brush support bracket 78. Hydraulic motor 100 is secured to a torque plate 86 by bolts 104 and 106. Torque plate 86 extends perpendicular to vertical side plates 80 and 82. Torque plate 86 is not physically connected to side plates 80 and 82, but prevents the casing of hydraulic motor 100 from rotating relative to vertical side plates 80 and 82 during operation. The output shaft (not shown) of hydraulic motor 100 extends through a hole formed in torque plate 86, and is connected to brush shaft 64 by coupler 101. The lower end of hydraulic motor 100 includes a bearing assembly 108 secured to bottom plate 84. Bottom plate 84 has a hole formed therethrough allowing brush shaft 64 to extend upwardly through bearing assembly 108 to hydraulic motor 100. A pair of hydraulic hoses (not shown) extend from hydraulic motor 100 to a hydraulic pump (not shown) used to supply motive force to hydraulic motor 100 in a manner well known to those skilled in the art. Application of such motive force causes hydraulic motor 100 to rotate brush shaft 64 which, in turn, rotates wrap brush 62 in order to clean a vehicle.

As indicated above, it is desirable to dampen swinging movement of wrap brush 62 in the front-back direction, relative to the direction of the vehicle path 16 (see FIG. 1). When the spinning wrap brush 62 first contacts the front surface of the vehicle, the brush has a tendency to bounce, whereas maximum cleaning efficiency requires that wrap brush 62 remain in contact with the surfaces of the vehicle. To minimize such brush bounce, the wrap brush assembly includes a shock absorber 110 having a first fixed end secured by bolt 112 to a mounting flange 114 secured to the upper portion of upper support arm 42. The second movable end of shock absorber 110 is secured to the upper end of a shock extension arm 116 by bolt 118. The upper end of shock extension arm 116 extends above the horizontal pivot link axis, i.e., above bearing shaft 74, and the lower end of shock extension arm 116 is welded to pivot link 66 for pivotal movement therewith. Shock absorber 110 thereby serves to dampen pivotal movement of pivot link 66 about the horizontal pivot link axis. As indicated within FIGS. 4 and 5, a slot 120 is formed in the upper planar surface of the U-shaped second end portion 56 of upper support arm 42 for allowing shock extension arm 116 to swing back and forth without contacting upper support arm 42.

Since pivot link 66 swings only front and back relative the direction of the vehicle path, shock absorber 110 dampens only front-back swinging movements of wrap brush 62. Shock absorber 110 is not directly connected to brush shaft 64, so shock absorber 110 does not interfere with or dampen side-to-side swinging movement of wrap brush 62, which is freely permitted by the pivotal connection between brush support bracket 78 and pivot link 66. On the other hand, because bearing shaft 92 is disposed perpendicular to bearing shaft 74, the dampening of front-back swinging movement of pivot link 66 due to shock absorber 110 is also effective to dampen any front-back swinging movement of wrap brush 62.

It has been mentioned above that one of the objects of the present invention is to prevent excessive inward swinging movement of a wrap brush to prevent the wrap brush from riding up the rear surface of the vehicle and climbing onto the trunk or rear deck of the vehicle. This objective is obtained by including a stop mechanism for limiting pivotal movement of brush support bracket 78 about the bracket pivot axis formed by bearing shaft 92 relative to said pivot link 66 for preventing wrap brush 62 from swinging inward toward the center of the vehicle path in excess of a predetermined angle. As shown in FIGS. 4 and 5, a length of angle stock 122, forming a right angle in cross section, includes a first vertical face secured to vertical side plate 80 by bolts 124 and 126. A rubber stop 128 is secured by a bolt 130 to a smaller length of angle stock 132 that is secured to pivot link 66 by bolts 134 and 136. In the event that brush support bracket 78 becomes inclined from a vertical axis by an excessive amount as wrap brush 62 swings toward the center of the vehicle path, then rubber stop 128 contacts the upper horizontal face of angle stock 122, thereby limiting further pivotal movement of wrap brush 62 toward the opposite side of the vehicle path, and preventing any further increase in the incline of brush shaft 64 from the vertical axis. In this manner, wrap brush 62 is prevented from climbing atop the trunk or rear deck of the vehicle.

FIGS. 6 and 7 show an alternate embodiment of the present invention wherein electric drive motors are substituted for the hydraulic drive motors already described in regard to FIGS. 4 and 5. Within FIGS. 6 and 7, components that correspond with those described above with regard to FIGS. 4 and 5 are designated by corresponding primed reference numerals. Electric drive motor 138 is supplied with electricity by a power cable 140. Electric drive motor 138 is coupled to a right-angle reduction gear box 142 that is secured to brush support bracket 78' for rotating brush shaft 64'. Otherwise, this alternate embodiment functions in a manner identical to that described above with respect to FIGS. 4 and 5.

As indicated earlier, another object of the present invention is to provide such a wrap brush assembly that reduces the torque transferred to the overhead support bridge by the wrap brush support arm, and which maintains the wrap brush assembly as a more compact unit. Returning to FIGS. 1 and 2, it has already been mentioned that upper support arm 28 pivots about a vertical axis formed by pivot pin 30, and that pivot pin 30 is supported by pivot bearings 24 and 26 secured to arm support brackets 20 and 22. It has also been noted above that arm support brackets 20 and 22 are directed away from horizontal support beam 18 in the direction lying opposite to the direction in which upper support arm 28 extends, i.e., on the opposite side of horizontal support beam 18 on which wrap brush 58 is supported. Thus, the vertical pivot axis for upper support arm 28 is displaced from the horizontal support beam in a direction lying opposite to the direction in which upper support arm 28 extends.

In this manner, the center of gravity of upper support arm 28 is located more closely to horizontal support beam 18 than if the vertical pivot axis were located either coincident with horizontal support beam 18 or on the same side thereof as wrap brush 58. Accordingly, upper support arm 28 does not exert as great a moment arm about horizontal support beam 18 and vertical standards 10 and 12, hence minimizing the likelihood of bowing in vertical standards 10 and 12. In addition, by displacing the vertical pivot axes of upper support arms 28 and 42 on the opposite sides of horizontal support beam 18 from the side at which wrap brushes 58 and 62 are disposed, the wrap brush assembly is provided as a more compact unit.

Preferably, upper support arm 28 is made somewhat longer than upper support arm 42, as shown best in FIG. 2. This selection of the relative lengths of the upper support arms helps to avoid interference between the first and second wrap brushes 58 and 62, and also helps to prevent so-called "skunk stripe", i.e., a dirty line extending along the central portion of the vehicle due to a failure of the two side wrap brushes 58 and 62 to sufficiently overlap surfaces of the vehicle cleaned by such brushes.

Those skilled in the art will now appreciate that an improved wrap brush assembly has been described which permits the wrap brushes to swing or twist to aid in moving around the corners of the vehicle, but which prevents the wrap brushes from swinging excessively inward or from climbing up the rear surface of the vehicle onto the trunk or rear deck of the vehicle. The disclosed wrap brush assembly dampens front-back swinging movement of the wrap brush without connecting the dampening element to the brush shaft, and without interfering with side-to-side swinging movement of the wrap brush. In addition, the disclosed wrap brush assembly reduces the torque transferred to the overhead support bridge by the wrap brush support arms, reducing bowing of the vertical standards of the bridge, and maintaining the wrap brush assembly as a more compact unit. The disclosed wrap brush assembly is easy and inexpensive to manufacture and to maintain.

While the present invention has been described with respect to preferred embodiments thereof, such description is for illustrative purposes only, and is not to be construed as limiting the scope of the invention. For example, while the preferred embodiment of the present invention illustrates the pivot link 66 as being pivotally coupled to upper support arm 42 about a horizontal axis that is perpendicular to support arm 42, another embodiment might orient such pivot link axis to be parallel to upper support arm 42 for allowing pivot link 66 to swing from side-to-side. In this event, brush support bracket 78 would be pivotally connected to the lower end of pivot link 66 about a horizontal axis extending perpendicular to the pivot link axis, and hence, perpendicular to upper support arm 42, for allowing brush support bracket 78 to swing forward and rearward. Various other modifications and changes may be made to the described embodiments by those skilled in the art without departing from the true spirit and scope of the invention as defined by the appended claims.

I claim:

1. A wrap brush assembly for cleaning the outer surfaces of a vehicle, said wrap brush assembly comprising in combination:
   a. an overhead support;
   b. an elongated upper support arm extending generally horizontally between first and second ends thereof, the first end of said upper support arm being pivotally connected to said overhead support for movement about a vertical axis;
   c. a pivot link having upper and lower opposing ends, the upper end of said pivot link being pivotally connected to the second end of said elongated support arm about a horizontal pivot link axis;
   d. a brush support bracket pivotally connected to the lower end of said pivot link about a bracket pivot axis, the bracket pivot axis extending perpendicular to said horizontal pivot link axis;
   e. a cleaning brush including a brush shaft supported by said brush support bracket and mounted rotatably thereto; and
   f. a motor secured to said brush support bracket for rotating said brush shaft.

2. The wrap brush assembly recited by claim 1 wherein said pivot link is a rigid member.

3. The wrap brush assembly recited by claim 1 further including a first shock absorber having a first end secured to said elongated upper support arm and a second end secured to said pivot link for dampening pivotal movement of said pivot link about the horizontal pivot link axis.

4. The wrap brush assembly recited by claim 3 wherein the second end of said first shock absorber is secured to said pivot link proximate the upper end thereof at a point disposed above said horizontal pivot link axis.

5. The wrap brush assembly recited by claim 3 further including a second shock absorber having a first end secured to said overhead support and a second end secured to said elongated upper support arm for dampening pivotal movement of said elongated upper support arm about said vertical axis.

6. The wrap brush assembly recited by claim 3 including stop means for limiting pivotal movement of said brush support bracket about said bracket pivot axis relative to said pivot link for preventing said cleaning brush from climbing onto elevated surfaces of a vehicle to be cleaned.

7. The wrap brush assembly recited by claim 6 wherein said cleaning brush is supported generally along one side of a path traversed by a vehicle to be cleaned, and wherein said stop means limits pivotal movement of said cleaning brush toward an opposite side of the path traversed by the vehicle to be cleaned.

8. The wrap brush assembly recited by claim 1 wherein said overhead support includes:
   a. a pair of vertical standards located on opposing sides of a path traversed by a vehicle to be cleaned;
   b. a horizontal support beam secured to and extending between said pair of vertical standards above the path traversed by the vehicle to be cleaned; and
   c. an arm support bracket having first and second opposing ends, the first end of said arm support bracket being secured to said horizontal support beam, said arm support bracket extending generally perpendicularly and horizontally from said horizontal support beam in a first direction relative to the path traversed by the vehicle to be cleaned;
   d. the first end of said elongated upper support arm being pivotally connected to the second end of said arm support bracket for movement about said vertical axis, said vertical axis being displaced from said horizontal support beam, and said elongated upper support arm extending generally horizontally from the first end thereof toward the second end thereof in a second direction relative to the path traversed by the vehicle to be cleaned, the second direction being opposite to said first direction.

9. A wrap brush assembly for cleaning the outer surfaces of a vehicle, said wrap brush assembly comprising in combination:
   a. a pair of vertical standards located on opposing sides of a path traversed by a vehicle to be cleaned;
   b. a horizontal support beam secured to and extending between said pair of vertical standards above the path traversed by the vehicle to be cleaned;
   c. a first arm support bracket having first and second opposing ends, the first end of said first arm support bracket being secured to said horizontal support beam, said first arm support bracket extending generally perpendicularly and horizontally from said horizontal support beam in a first direction relative to the path traversed by the vehicle to be cleaned;

d. a first elongated upper support arm extending generally horizontally between first and second ends thereof, the first end of said first elongated upper support arm being pivotally connected to the second end of said first arm support bracket for movement about a first vertical axis, said first vertical axis being displaced from said horizontal support beam, and said first elongated upper support arm extending generally horizontally from the first end thereof toward the second end thereof in a second direction relative to the path traversed by the vehicle to be cleaned, the second direction being opposite to said first direction; and e. a first brush support bracket pivotally connected to the second end of said first elongated support arm;

f. a first cleaning brush including a first brush shaft supported by said first brush support bracket and mounted rotatably thereto; and g. a first motor secured to said first brush support bracket for rotating said first brush shaft.

10. The wrap brush assembly recited by claim 9 wherein the path traversed by the vehicle to be cleaned is bounded by first and second opposing sides, and wherein:

a. said first arm support bracket lies closer to the first side of the path traversed by the vehicle to be cleaned than to the opposing second side; and b. said wrap brush assembly further includes:
  i. a second arm support bracket disposed closer to the second side of the path traversed by the vehicle to be cleaned than to the opposing first side, said second arm support bracket having first and second opposing ends, the first end of said second arm support bracket being secured to said horizontal support beam, said second arm support bracket extending generally perpendicularly and horizontally from said horizontal support beam in the first direction relative to the path traversed by the vehicle to be cleaned;
  ii. a second elongated upper support arm extending generally horizontally between first and second ends thereof, the first end of said second elongated upper support arm being pivotally connected to the second end of said second arm support bracket for movement about a second vertical axis, said second vertical axis being displaced from said horizontal support beam, and said second elongated upper support arm extending generally horizontally from the first end thereof toward the second end thereof in the second direction relative to the path traversed by the vehicle to be cleaned; and
  iii. a second brush support bracket pivotally connected to the second end of said second elongated support arm;
  iv. a second cleaning brush including a second brush shaft supported by said second brush support bracket and mounted rotatably thereto; and
  v. a second motor secured to said second brush support bracket for rotating said second brush shaft.

11. The wrap brush assembly recited by claim 10 wherein said first elongated upper support arm is longer than said second elongated upper support arm to avoid interference between said first and second cleaning brushes and to ensure that portions of the front and rear surfaces of the vehicle cleaned by said first cleaning brush overlap with portions of the front and rear surfaces of the vehicle cleaned by said second cleaning brush.

* * * * *